United States Patent [19]

Kawamoto et al.

[11] Patent Number: 4,912,639
[45] Date of Patent: Mar. 27, 1990

[54] FOUR-WHEEL DRIVE VEHICLE HAVING FRONT-AND REAR-WHEEL ENGAGING MECHANISM

[75] Inventors: Mutumi Kawamoto; Takashi Yamada; Takenori Kano, all of Anjo, Japan

[73] Assignees: Aisin-Warner Kabushiki Kaisha, Aichi; Kabushiki Kaisha Shinsangyokaihatsu, Tokyo, both of Japan

[21] Appl. No.: 67,851

[22] Filed: Jun. 30, 1987

[30] Foreign Application Priority Data

Jun. 30, 1986 [JP] Japan ................................ 61-154321

[51] Int. Cl.⁴ ..................... G06F 15/20; B60K 17/346
[52] U.S. Cl. ................................... 364/424.1; 180/248
[58] Field of Search ....................... 364/424.1; 180/197, 180/233, 248, 249; 74/665 T, 856, 866

[56] References Cited

U.S. PATENT DOCUMENTS

| | | | |
|---|---|---|---|
| 4,471,438 | 9/1984 | Futagi et al. ..................... | 74/866 X |
| 4,558,414 | 12/1985 | Sakakiyama ..................... | 180/197 X |
| 4,566,554 | 1/1986 | Suzuki ................................. | 180/249 |
| 4,613,008 | 9/1986 | Hiraiwa et al. .................... | 180/247 |
| 4,662,686 | 5/1987 | Matsuda .............................. | 303/106 |
| 4,671,138 | 6/1987 | Nobumoto et al. .................. | 74/862 |
| 4,711,318 | 12/1987 | Kitade ................................. | 180/247 |
| 4,727,966 | 3/1988 | Hiramatsu et al. ............. | 180/249 X |
| 4,744,437 | 5/1988 | Matsumoto .......................... | 180/249 |
| 4,754,835 | 7/1988 | Stelter et al. ........................ | 180/248 |
| 4,765,434 | 8/1988 | Kawamoto et al. ................ | 180/249 |

FOREIGN PATENT DOCUMENTS

| | | |
|---|---|---|
| 3206694 | 1/1983 | Fed. Rep. of Germany . |
| 58-56922 | 4/1983 | Japan . |
| 0135327 | 7/1985 | Japan .................................. 180/248 |
| 2111151 | 6/1983 | United Kingdom . |
| 2114252 | 8/1983 | United Kingdom . |
| 2118267 | 10/1983 | United Kingdom . |
| 2118666 | 11/1983 | United Kingdom . |
| 2140104 | 11/1984 | United Kingdom ................ 180/249 |
| 2146961 | 5/1985 | United Kingdom . |
| 2158270 | 11/1985 | United Kingdom . |

*Primary Examiner*—David Mis
*Attorney, Agent, or Firm*—Varndell Legal Group

[57] ABSTRACT

A four-wheel drive vehicle having a front- and rear-wheel engaging mechanism designed to enable differential limiting means provided between the front and rear wheels to be controlled over the range from the direct coupling position to the disengaged position through the slip region by the control of the degree of engagement. The vehicle is provided with engaging means for driving the front- and rear-wheel engaging mechanism at a set degree of engagement, detecting means for detecting a running condition, and control means for setting a degree of engagement to control the engaging means. The control means has reference data concerning degrees of engagement respectively corresponding to various running conditions, and sets a degree of engagement selected from the reference data in accordance with the detected running condition. Thus, it is possible to engage the front- and rear-wheel engaging mechanism in such a manner as to prevent the occurrence of tight corner braking while avoiding slipping.

20 Claims, 8 Drawing Sheets

FOUR-WHEEL DRIVE VEHICLE HAVING FRONT-AND REAR-WHEEL ENGAGING MECHANISM

BACKGROUND OF THE INVENTION

The present invention relates to a four-wheel drive vehicle having a front- and rear-wheel engaging mechanism designed to enable differential limiting means provided between the front and rear wheels to be controlled over the range from the direct coupling position to the disengaged position through the slip region by the control of the degree of engagement.

Generally, in the running of automobiles the front wheel drive is superior to the rear wheel drive in straight running stability, but during cornering the front wheel drive meets with the problem that it is relatively difficult to turn the car because force must be applied to the tires through the steering wheel so that the tires are kept from returning to the normal position that is assumed during the straight running. On the other hand the rear wheel drive enables the car to corner relatively easily, but it involves the disadvantage that excessively large drive power may cause the car to turn more than is desired. Accordingly, it is ideal practice from the viewpoint of running of automobiles to drive the front and rear wheels evenly with substantially equal powers, and four-wheel drive vehicles are considerably superior from this point of view.

During cornering, right and left wheels of a car have different radii of rotation. Therefore, in order to absorb the difference and to thereby enable smooth cornering, automobiles are generally provided with mechanisms designed to absorb the difference in number of revolutions between the right and left wheels in accordance with the difference in the radius of rotation, i.e., differential mechanisms (front and rear differential mechanisms). The difference in the radius of rotation also occurs between the front and rear wheels. Therefore, there has been proposed one type of four-wheel drive vehicle which is provided with a mechanism adapted for absorbing the difference in number of revolutions between the front and rear wheels in accordance with the difference in the radius of rotation, i.e., the center differential mechanism.

This center differential mechanism suffers, however, from the following problem. Since the mechanism is adapted to distribute torque evenly to the front and rear wheels, the power transmission limit is balanced with the one of the driving forces acting on the front and rear wheels which has a lower value. For example, if one of the front wheels slips, the driving energy escapes from the slipping wheel, so that the driving force for the rear wheels becomes extremely small. For this reason, a four-wheel drive vehicle with a center differential mechanism may be inferior to a four-wheel drive vehicle with no center differential mechanism in terms of the transmission of drive power when, for example, the vehicle is running on a road surface having a relatively small coefficient of friction. Accordingly, when relatively large drive power is generated during, for example, acceleration, it may be impossible to sufficiently transmit the drive power to the road surface, resulting in the front or rear wheels slipping undesirably.

In order to prevent the occurrence of such an unfavorable phenomenon, a four-wheel drive vehicle with a center differential mechanism has heretofore been provided with a lock mechanism which is adapted to directly couple together the differential limiting means for the front and rear wheels without interposition of the center differential mechanism therebetween, so that, when relatively large drive power is required, for example, when the vehicle is being accelerated or running on a rough road, the center differential mechanism is manually locked, whereas, when the vehicle is in a normal running state wherein no specially large drive power is needed, the center differential mechanism is manually unlocked.

Figure 10:
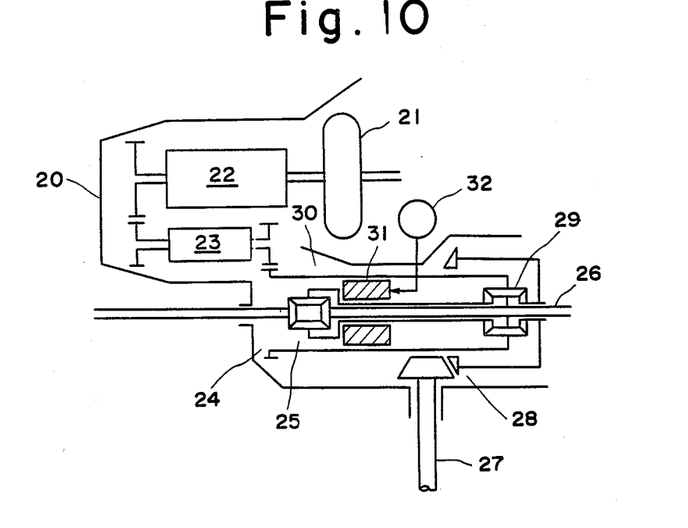
FIG. 10 schematically shows a power transmission mechanism employed in a full-time four-wheel drive vehicle with a center differential mechanism which has an engine mounted on the front side.

FIG. 10 shows a power transmission mechanism employed in a full-time four-wheel drive vehicle with a center differential mechanism which has an engine mounted on the front side. In this power transmission mechanism, the power from the engine is transmitted to a torque converter 21, a main transmission gear 22 and a subsidiary transmission gear 23, which are disposed within an automatic transmission 20, and the output from the subsidiary transmission gear 23 is transmitted to a driving gear 24 and then to a front-wheel driving shaft 26 through the driving gear 24, thus driving the front wheels. The front differential mechanism 25 provided in this power transmission mechanism is a differential mechanism which acts between the right and left front wheel. On the other hand, a propeller shaft 27 for driving the rear wheels is coupled through a bevel gear 28 to a center differential mechanism 29 which is adapted to act between the front and rear wheels, the center differential mechanism 29 being coupled to a rear-wheel transmission 30. Further, a clutch 31 for locking the center differential mechanism 29 is disposed in parallel to it. Accordingly, the locking of the center differential mechanism 29 is controlled by controlling the engaged state of the clutch 31 by means of an oil-hydraulic circuit (pressure control solenoid) 32.

Figure 12:
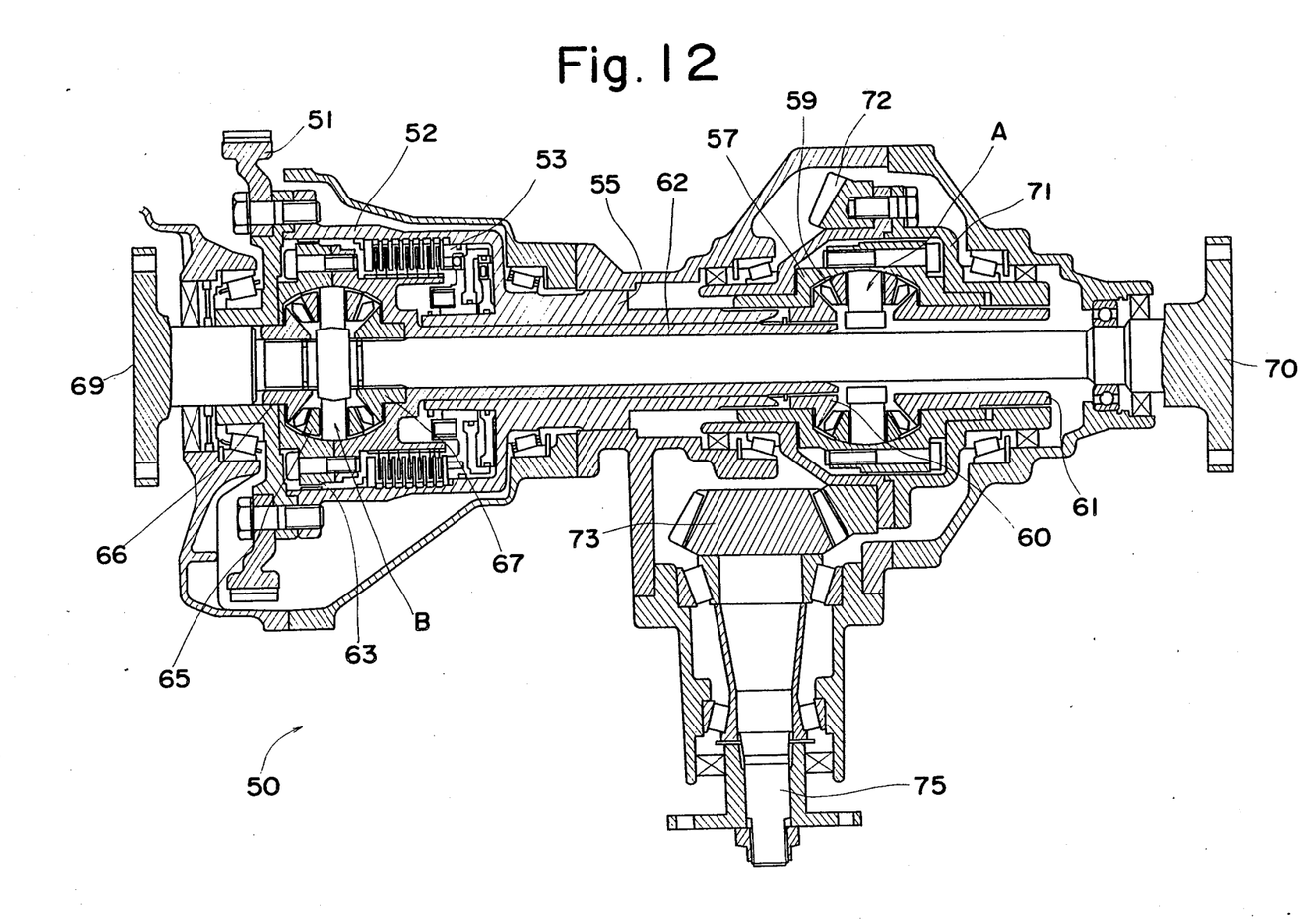
FIG. 12 is a sectional view showing in detail the power transmission mechanism shown in FIG. 10.

The above-described power transmission mechanism will be explained in more detail with reference to FIG. 12. The rotation of the engine is transmitted to a front differential case 52 through a ring gear 51 after the speed of rotation has been appropriately changed through an automatic transmission mechanism. In a normal running stage, a clutch 53 for locking a center differential mechanism A is in a disengaged state, and in this state, the rotation of the front differential case 52 is transmitted through a first hollow shaft 55 to a differential carrier 57 in the center differential mechanism A and is further transmitted from a differential pinion 59 to left and right side gears 60 and 61. The rotation of the left side gear 60 is transmitted through a second hollow shaft 62 to a differential carrier 63 in a front differential mechanism B and is further transmitted from a differential pinion 65 to left and right side gears 66 and 67 from which the rotation is transmitted to left and right front wheel driving shafts 69 and 70. On the other hand, the rotation of the right side gear 61 is transmitted to a center differential case 71 which is in spline coupling to the gear 61, and the rotation is further transmitted to a drive pinion shaft 75 through ring gears 72 and 73 for driving the rear wheels and is then transmitted to left and right rear wheel driving shafts (not shown) through propeller shaft and rear differential mechanism (not shown).

When relatively large drive power is required because the vehicle is running on a bad road such as a frozen, sandy or rough road, or when there is a fear of the wheels slipping, the clutch 53 is engaged to lock the center differential mechanism A. In this state the rotation of the front differential case 52 is directly transmitted to the differential carrier 63 in the front differential mechanism B through the clutch 53 and is further transmitted from the differential pinion 65 to the left and right side gears 66 and 67 from which the rotation is transmitted to the left and right front wheel driving shafts 69 and 70. At the same time, the differential carrier 57 and left side gear 60 in the center differential mechanism A which are coupled to the front differential case 52 and the differential carrier 63 through the hollow shafts 55 and 62, respectively, are rotated together in one unit without performing any differential motion, and this rotation is further transmitted to the center differential case 71. Thus, rotation the speed of which is the same as the front wheel driving differential carrier 63 is transmitted to the rear wheel driving ring gear 72, and the right and left rear wheel driving shafts are thereby driven.

In general, four-wheel drive vehicles include full-time four-wheel drive vehicles which are provided with center differential mechanisms as described above, and part-time four-wheel drive vehicles with no center differential mechanisms. In the latter type of four-wheel drive vehicle, either the front or rear wheels are normally driven, and when relatively large drive power is required, for example, when the vehicle is running on a snow-covered road, the other wheels are appropriately coupled directly to the driving shaft through a clutch or the like, thus switching the two- and four-wheel drive modes from one to the other as desired.

One of the conditions which cause the vehicles to slip is large drive power. Therefore, noting the fact that, if the two-wheel drive mode is exchanged for the four-wheel drive mode as described above, the tire gripping force is increased so as to enable prevention of slipping, there has been proposed a technique wherein the two-wheel drive mode is switched to the four-wheel drive mode when the select lever is shifted to a position for relatively large drive power so as to prevent occurrence of slip. More specifically, according to the proposed technique, when the select lever applied to a part-time four-wheel drive vehicle is shifted to the range "1" or "2", the two-wheel drive mode is switched to the four-wheel drive mode. There has also been proposed a technique wherein, when the drive power is relatively large, the two-wheel drive mode is switched to the four-wheel drive mode in accordance with the degree of opening of the accelerator.

Figure 11:
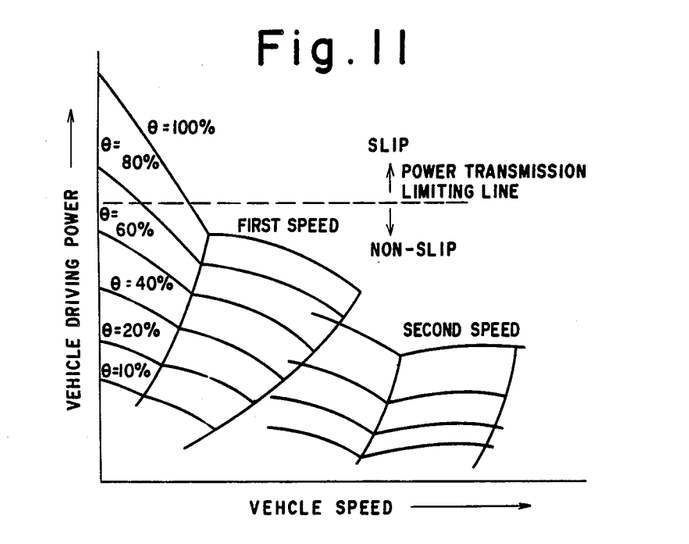
FIG. 11 is a chart showing the relationship between the gear position, vehicle speed and throttle opening on the one hand and the drive power on the other.

However, drive power, particularly, depends strongly on the transmission ratio: namely, the lower the gear position, the larger the drive power. Further, in the case of an automatic transmission, the vehicle driving power varies greatly in accordance with the degree of accelerator opening and the vehicle speed as shown in FIG. 11. Therefore, the occurrence of slip cannot completely be prevented only on the basis of the degree of accelerator opening or the position of the select lever shifted by the manual operation. For example, to rapidly accelerate a vehicle equipped with an automatic transmission, it is common practice to step on the accelerator, and the shift lever is rarely actuated. Therefore, the system in which the two-wheel drive mode is switched to the four-wheel drive mode in accordance with the position of the select lever cannot be expected to function effectively as a slip preventing means.

On the other hand, when the differential operation of the center differential mechanism of a full-time four-wheel drive vehicle is limited, no differential control for the front and rear wheels is performed. Accordingly, when the vehicle turns at low speed, tight corner braking occurs, whereas, when the vehicle is running at high speed, if the front and rear wheels are imbalanced with each other in terms of air pressure or load, the fuel consumption is increased, disadvantageously.

SUMMARY OF THE INVENTION

In view of the above-described problems of the prior art, it is a primary object of the present invention to provide a four-wheel drive vehicle having a front- and rear-wheel engaging mechanism which enables setting of a degree of engagement suitable for each running condition and which permits prevention of the occurrence of tight corner braking while avoiding slipping.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

To attain the above-described object, the present invention provides a four-wheel drive vehicle having a front- and rear-wheel engaging mechanism designed to enable differential limiting means provided between the front and rear wheels to be controlled over the range from the direct coupling position to the disengaged position through the slip region by the control of the degree of engagement, which comprises: engaging means for driving the front- and rear-wheel engaging mechanism at a set degree of engagement; detecting means for detecting a running condition; and control means for getting a degree of engagement to control the engaging means, the control means having reference data concerning degrees of engagement respectively corresponding to various running conditions and setting a degree of engagement selected from the reference data in accordance with the detected running condition.

In the four-wheel drive vehicle having a front- and rear-wheel engaging mechanism according to the present invention having the above-described arrangement, the control means sets a degree of engagement for the engaging means on the basis of the reference data concerning degrees of engagement respectively corresponding to various running conditions. It is therefore possible to control the engaging means with an optimal degree of engagement. Accordingly, the front- and rear-wheel engaging mechanism can be engaged in such a manner that it is possible to prevent the occurrence of tight corner braking while avoiding slipping.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Preferred embodiments of the present invention will be described hereinunder in detail with reference to the accompanying drawings.

Figure 1:
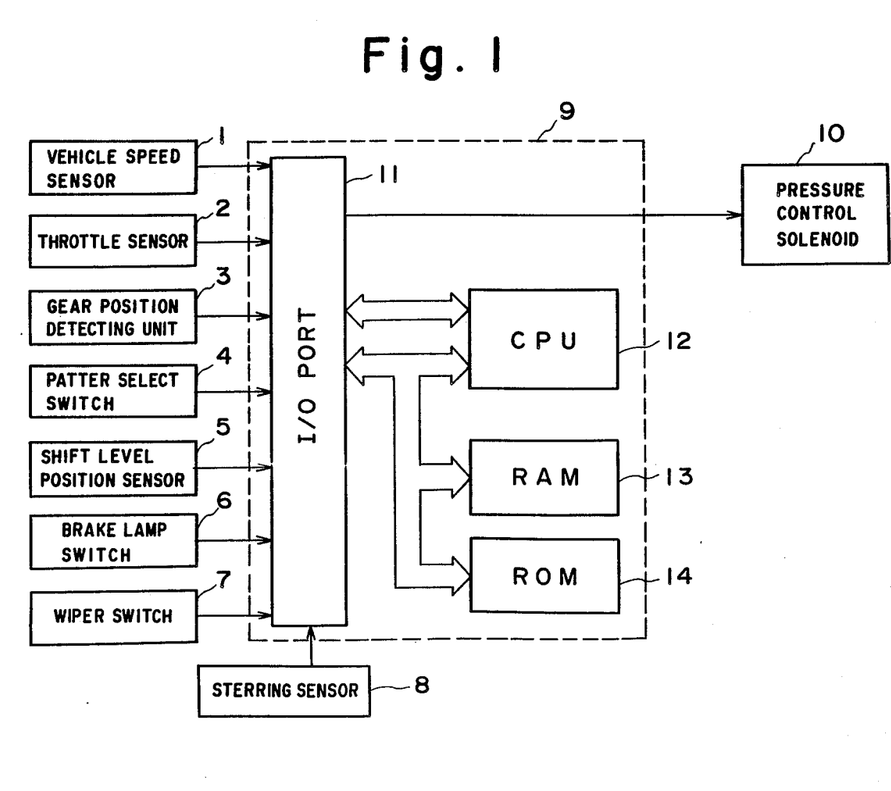
FIG. 1 shows the arrangement of one embodiment of a control system for a four-wheel drive vehicle having a front- and rear-wheel engaging mechanism according to the present invention.
Figure 2:
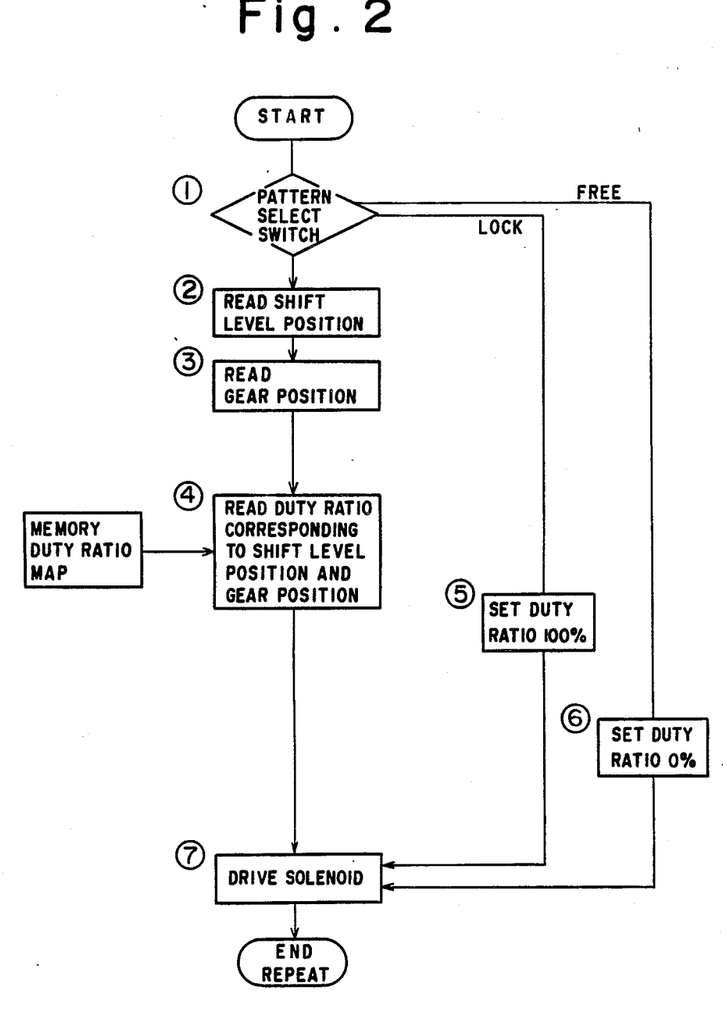
FIGS. 2 and 3 are flowcharts showing examples of processings executed by the electronic control unit shown in FIG. 1.
Figure 3:
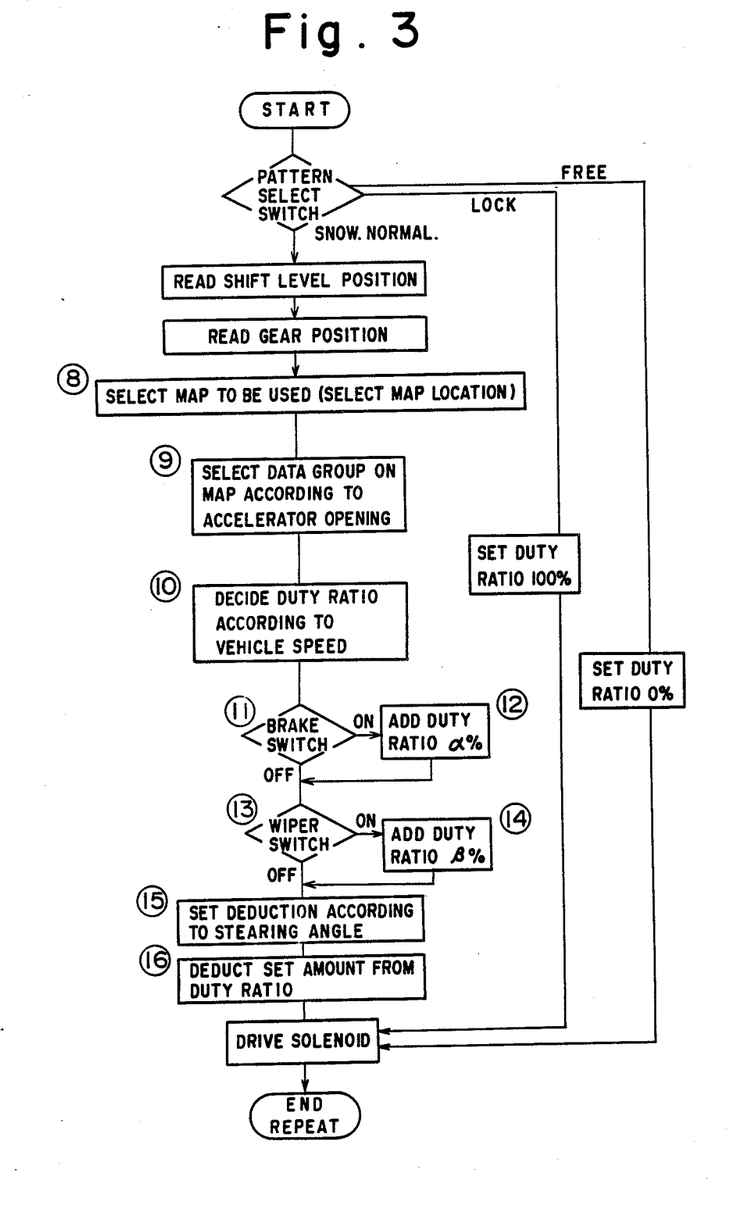

FIG. 1 shows the arrangement of one embodiment of a control system for a four-wheel drive vehicle having a front- and rear-wheel engaging mechanism according to the present invention, while FIGS. 2 and 3 are flowcharts showing examples of processings executed by the electronic control unit shown in FIG. 1.

Referring to FIG. 1, the reference numeral 1 denotes a vehicle speed sensor, 2 a throttle sensor, 3 a gear position detecting unit, 4 a pattern select switch, 5 a shift lever position sensor, 6 a brake lamp switch, 7 a wiper switch, 8 a steering sensor, 9 an electronic control unit, 10 a pressure control solenoid, 11 an I/O port, 12 a CPU, 13 a RAM, and 14 a ROM. The electronic control unit is a computer control unit having memories such as the RAM 13 and the ROM 14 for storing, for example, a control program and a duty ratio map, the CPU (arithmetic processing unit) 12, and the I/O port 11. The electronic control unit 9 reads through the I/O port 11 signals from various sensors and switches (1 to 8), and refers to the map on the basis of signals indicating a transmission ratio, vehicle speed, accelerator opening, wiper switch position, shift lever position, brake position, select switch position and steering angle, thereby setting (continuously or stepwisely) a hydraulic pressure (duty ratio) for activating a hydraulic clutch, and thus controlling the pressure control solenoid 10. In the case of a full-time four-wheel drive vehicle with a center differential mechanism, the pressure control solenoid 10 controls the engagement of a clutch for locking the center differential mechanism, and the operation of the actuating mechanism is limited by the control of the degree of engagement of the clutch. In the case of an automatic transmission, the gear position detecting unit 3 reads a control signal from the controller for the transmission, or reads a signal indicating the level of hydraulic pressure for engagement which is to be used for a selected gear position, whereas, in the case of a manual transmission, the gear position detecting unit 3 reads a shift lever position.

Thus, the control system according to the present invention is arranged to determine, using a map, a slip region and a tight corner braking region in accordance with running condition signals such as those indicating a transmission ratio, vehicle speed, accelerator opening, wiper position, shift lever position, brake position, select switch position and steering angle. Accordingly, it is possible to decide a duty ratio which is most suitable for avoiding the occurrence of slip and tight corner braking in conformity with all running conditions, and the pressure control solenoid 10 can be controlled with the decided duty ratio so that the operation of the differential mechanism is effectively limited.

The following is a description of the flowchart of FIG. 2 which shows the processing executed by the electronic control unit 9 in the case where the pressure control solenoid 10 is controlled in accordance with the gear ratio, pattern select switch position and shift lever position.

First, the position of the pattern select switch 4 is checked, and when the switch 4 is in the position "LOCK", the solenoid duty ratio is set at 100%, whereas, when the switch position is "FREE", the solenoid duty ratio is set at 0%. Then, the solenoid 10 is driven ( ① → ⑤ , ⑥ → ⑦ ). When the pattern select switch 4 is not in either of the two positions (i.e., the switch position is "SNOW" or "NORMAL"), signals from the shift lever position sensor 5 and the gear position detecting unit 3 are read ( ① to ③ ).

Then, the control unit 9 read a solenoid duty ratio corresponding to the values of the read shift lever position and gear position signals from the duty ratio map stored in the memory, and drives the solenoid 10 with the read duty ratio ( ④ → ⑦ ).

FIG. 3 is a flowchart showing one example of a processing in which a plurality of maps are prepared so that an optimal solenoid duty ratio is decided using the accelerator opening and other signals in addition to the shift lever position signal and the gear position signal. Since the control program shown in FIG. 3 is the same as that shown in FIG. 2 except that the processing executed in Step ④ in FIG. 2 is replaced with the processing executed in Steps ⑧ to ⑯ in FIG. 3, the processing carried out in Steps ⑧ to ⑯ be explained below.

First, a duty ratio map (the address of a map) which is to be used is decided on the basis of the three signals, i.e., the signals respectively indicating the pattern select switch position, shift lever position and gear position.

Then, a degree of accelerator opening is detected, and a data group on the map which corresponds to the detected degree of accelerator opening is selected. Further, a vehicle speed is detected, and a duty ratio is calculated on the basis of the detected vehicle speed ( ⑨ , ⑩ ).

If the brake switch 6 or/and the wipe switch 7 are ON, this shows that the vehicle is in running conditions where it is more liable to slip than in normal running conditions. Therefore, predetermined duty ratios $\alpha\%$ and $\beta\%$ are added to the decided duty ratio. Further, a steering angle is detected by means of the steering sensor 8, and a hydraulic pressure deduction in accordance with the detected steering angle is set ( ⑪ to ⑯ ), and then, the solenoid 10 is driven.

Figure 4:
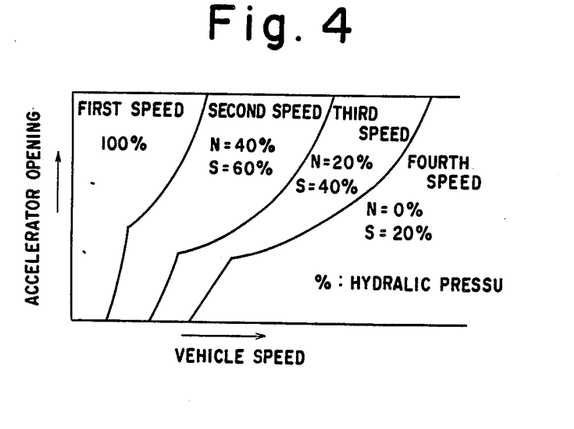
FIGS. 4 to 8 respectively show examples of duty ratio maps.

Examples of the maps used in the above-described processings will be described below. FIGS. 4 o 8 show examples of duty ratio maps, and FIG. 9 shows one example of a map used to set a hydraulic pressure deduction in accordance with the detected steering angle.

FIG. 4 shows one example of a map wherein the duty ratio is set in accordance with the gear position and the pattern select switch position. According to this map, the duty ratio is so set that, when the gear position is within the first-speed region, the duty ratio is set at 100%, whereas, when the gear position is within the second-, third- and fourth-speed regions, if the pattern select switch position is N (NORMAL), the duty ratio is set at 40%, 20% and 0%, respectively; if the pattern select switch position is S (SNOW), the duty ratio is set so as to be 20% higher than those in the case of N (NORMAL).

Figure 5:
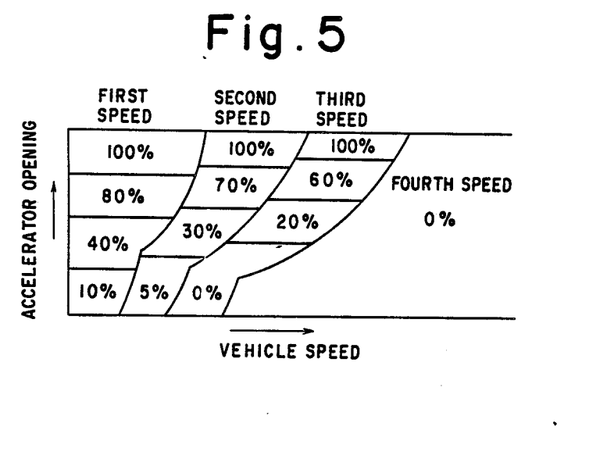

FIG. 5 shows one example wherein a duty ratio map is set in accordance with the gear position and the degree of accelerator opening. According to this map, when the degree of accelerator opening is high, the duty ratio is set at 100%; as the degree of accelerator opening decreases, the duty ratio is decreased; and as the gear position becomes higher, the duty ratio is decreased.

Figure 6:
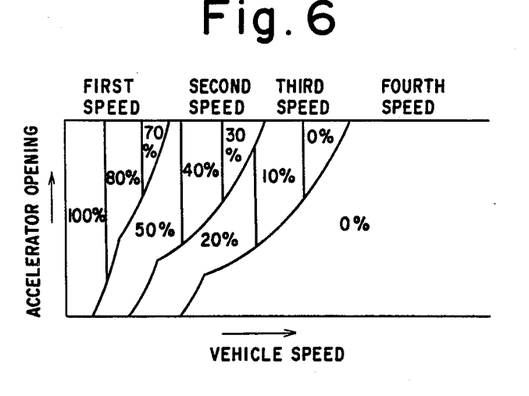

FIG. 6 shows one example wherein a duty ratio map is set in accordance with the gear position and the vehicle speed. According to this map, as the gear position becomes higher and the vehicle speed is increased, the duty ratio is decreased.

Figure 7:
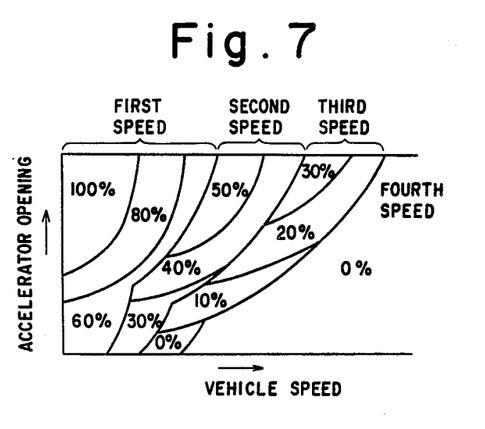

FIG. 7 shows one example wherein a duty ratio map is set in accordance with the degree of accelerator opening and the vehicle speed. According to this map, as the gear position and the vehicle speed become higher and the degree of accelerator opening decreases, the duty ratio is decreased.

Figure 8:
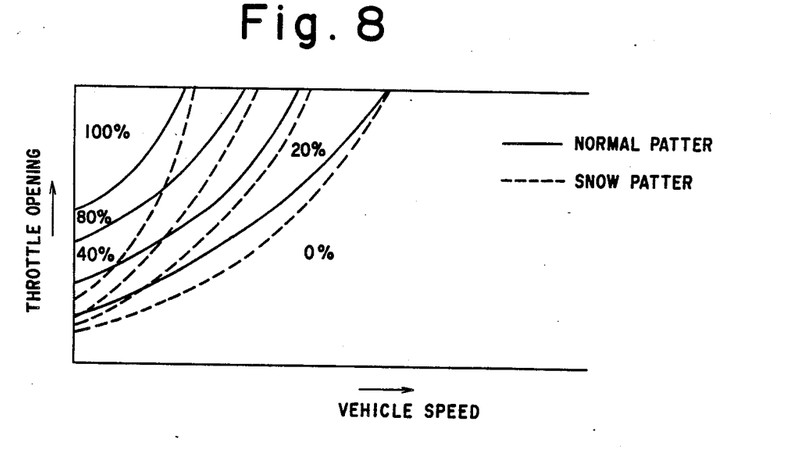
Figure 9:
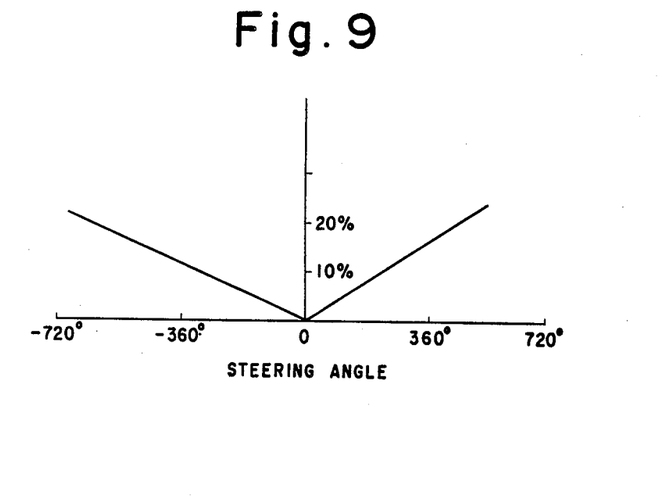
FIG. 9 shows one example of a map used to set a hydraulic pressure deduction on the basis of the steering angle.

FIG. 8 shows one example wherein the duty map is changed in accordance with the pattern select switch position. As shown in the figure, in the case of the snow pattern, the duty ratio map is enlarged in the direction in which the degree of throttle opening decreases (and in the direction in which the vehicle speed increases).

When the gear position and the vehicle speed are high and the degree of accelerator opening is low, the drive power is relatively small, and there is a weak possibility of the vehicle slipping. Therefore, in the above-described maps, the duty ratio is set in conformity with such running conditions. If the steering angle alone is changed in certain running conditions, as the steering angle increases, the difference in the radius of rotation between the front and rear wheels increases. Accordingly, in order to absorb such a difference in terms of the radius of rotation, a duty ratio deduction is set in accordance with the detected steering angle. FIG. 9 shows one example of a map used to set such a deduction.

As will be clear from the foregoing description, when the differential operation of the center differential mechanism is limited, no differential control for the front and rear wheels is performed, and this involves demerits such as the occurrence of tight corner braking during turning at low speed and deterioration of fuel consumption during high-speed running (when the front and rear wheels are imblanced with each other in terms of air pressure or load). However, according to the present invention, a region which involves a fear of slip can accurately be detected by the use of maps so that the occurrence of slip is effectively prevented and the above-described problems are avoided. Further, the occurrence of tight corner braking can be avoided by reducing the engagement pressure supplied to the locking mechanism in accordance with the detected steering angle.

It should be noted that the present invention is not necessarily limitative t the above-described embodiment and various changes and modifications may be imparted thereto.

For example, although in the described embodiment the front-and rear-wheel engaging mechanism is applied to a full-time four-wheel drive vehicle with a center differential mechanism, it may similarly be applied to a part-time four-wheel drive vehicle. The front- and rear-wheel engaging mechanism in this case is designed to enable the differential limiting mean provided between the front and rear wheels to be controlled over the range from the direct coupling position to the disengaged position through the slip region. In the case of a full-time four-wheel drive vehicle, the mechanism is a clutch for locking the center differential mechanism; in the case of a part-time four-wheel drive vehicle, the mechanism is a center clutch for directly coupling the front and rear wheels. More specifically, the clutch is not necessarily limited to the hydraulic clutch, and it is possible to employ any type of clutch which is capable of controlling the degree of engagement, such a an electromagnetic clutch.

The reference data in the form of the maps shown in FIGS. 4 to 7 is basically prepared in such a manner that a two-dimensional area which is defined by the degree of accelerator opening and the vehicle speed is divided into a plurality of regions and degrees of engagement are set in these divided regions, respectively. Accordingly, in the case of a vehicle equipped with an automatic transmission, two parameters selected from the accelerator opening, vehicle speed and gear position may be employed, and it is also possible to prepare a plurality of such maps and selectively use them in accordance with the running conditions or in response to the driver's selecting operation.

What is claimed is:

1. A four-wheel drive vehicle having front- and rear-wheel engaging mechanisms and differential limiting means provided therebetween for controlling slip between said front- and rear- engaging mechanisms over a range from a direct coupling position to a disengaged position through a slip region including:
   engaging means for driving said differential limiting means at a set degree of engagement and thereby driving said front- and rear-wheel engaging mechanism at a corresponding degree of engagement;
   detecting means for detecting a running condition of said vehicle including means for detecting vehicle driving power and vehicle speed; and
   computer means for setting said degree of engagement of said engaging means, said computer means having a map containing a plurality of reference data including reference data corresponding to various vehicle power and vehicle speed conditions; selecting an appropriate reference data based on said detected vehicle running condition including vehicle driving power and vehicle speed; and based upon said selected reference data setting a degree of engagement of said engaging means.

2. A four-wheel drive vehicle according to claim 1, wherein said differential limiting means includes a center differential mechanism for absorbing a difference in terms of the radius of rotation between front and rear wheels of said vehicle through said front- and rear-engaging mechanisms, said front-wheel engaging mechanism including a drive shaft arranged between front wheels of said vehicle and said center differential mechanism being arranged about said drive shaft.

3. A four-wheel drive vehicle according to claim 1 wherein said reference data is prepared in such a manner that a two-dimensional area which is defined by the degree of accelerator opening and the vehicle speed is divided into a plurality of regions and degrees of engagement are set in these divided regions, respectively.

4. A four-wheel drive vehicle according to claim 1 wherein said reference data is prepared by setting degrees of engagement in correspondence with speed-change gear positions, respectively.

5. A four-wheel drive vehicle according to claim 1 wherein the degree of engagement is set in terms of the duty ratio for driving said engaging means.

6. A four-wheel drive vehicle according to claim 1 wherein the degree of engagement is changed in accordance with the road surface condition.

7. A four-wheel drive vehicle according to claim 1 wherein the degree of engagement is changed when the brake is in an operative state.

8. A four-wheel drive vehicle according to claim 1 wherein the degree of engagement is changed in accordance with the steering angle.

9. A four-wheel drive vehicle having a center differential coupled between front wheels and rear wheels of said vehicle for absorbing a rotational speed difference between said front wheels and rear wheels, including
    a center differential engaging mechanism for controlling differential limiting conditions of said center differential from a direct coupling to a slip region;
    engaging means for driving said center differential engaging mechanism at a set degree of engagement;
    detecting means for detecting vehicle running conditions; and
    computer means having a map with a plurality of reference data concerning various degrees of engagement respectively corresponding to various running conditions for selecting one of said plurality of reference data in accordance with a detected running condition and setting a degree of engagement of said engaging means and thereby a degree of engagement of said differential in accordance with a selected reference data.

10. A four-wheel drive vehicle according to claim 9, wherein said computer means has a plurality of kinds of reference data corresponding to various running conditions.

11. A four-wheel drive vehicle according to claim 9, wherein said reference data includes a two-dimensional area defined by the degree of accelerator opening and the vehicle speed which area is divided into a plurality of regions, each region having degree of engagement corresponding thereto.

12. A four-wheel drive vehicle according to claim 9, wherein said reference data includes degrees of engagement corresponding to speed gear positions.

13. A four-wheel drive vehicle according to claim 9, wherein said degree of engagement is adjusted in accordance with the road surface conditions.

14. A four-wheel drive vehicle according to claim 9, wherein said degree of engagement is adjusted when the brake is in an operative mode.

15. A four-wheel drive vehicle according to claim 9, wherein said degree of engagement is adjusted in accordance with the steering angle.

16. A four-wheel drive vehicle having a transmission comprising:
    a center differential means driven directly by said transmission and directly coupled through a slip region to a front-and rear-wheel engaging mechanisms.
    said center differential means including a center differential means for controlling an amount of coupling between said front-and rear-engaging mechanisms, and engaging means for engaging said center differential engaging means at a set amount of engagement;
    detecting means for detecting vehicle running condition; and
    computer means for setting said amount of engagement of said center differential engaging means, said computer means having a map containing reference data including varying amounts of engagement respectively corresponding to various running conditions and setting said amount of engagement selected from said reference data in accordance with said detected running conditions.

17. The four-wheel drive vehicle according to claim 16, wherein said center differential means provides continuous four-wheel drive both when engaged and disengaged, and when engaged said center differential engaging means directly coupling the front- and rear-wheel engaging mechanisms, and when disengaged said center differential means coupling the front and rear-engaging means through a front-wheel differential mechanism.

18. A four-wheel drive vehicle according to claim 16, wherein sad computor means has a plurality of kinds of reference data corresponding to various running conditions.

19. A four-wheel drive vehicle according to claim 16, wherein said reference data includes a two-dimensional area defined by an amount of accelerator opening and a vehicle speed which area is divided into a plurality of regions, each region having an amount of engagement corresponding thereto.

20. A four-wheel drive vehicle according to claim 16, wherein said reference data includes amounts of engagement corresponding to speed gear positions.

* * * * *